US006300272B1

(12) United States Patent
Bodart (10) Patent No.: US 6,300,272 B1
(45) Date of Patent: Oct. 9, 2001

(54) CATALYSTS FOR POLYETHYLENE PRODUCTION AND USE THEREOF

(75) Inventor: Philippe Bodart, Clermont-sous-Huy (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/325,924

(22) Filed: Jun. 4, 1999

(30) Foreign Application Priority Data

Jun. 5, 1998 (EP) .................................................. 98110247

(51) Int. Cl.[7] .................................. C08F 4/02; C08F 4/22
(52) U.S. Cl. ........................ 502/120; 502/104; 502/113; 526/113; 526/154
(58) Field of Search .............................. 526/90, 113, 129, 526/154, 172; 502/104, 113, 120

(56) References Cited

U.S. PATENT DOCUMENTS 4,364,839 * 12/1982 McDaniel et al. ................... 252/430
5,849,582 * 12/1998 Koch et al. ............................ 526/96

FOREIGN PATENT DOCUMENTS

| 0055864 | 7/1982 | (EP) . |
| 07127868 | 5/1996 | (EP) . |
| 0757063 | 2/1997 | (EP) . |
| 0799841 | 10/1997 | (EP) . |
| 9426790 | 11/1994 | (WO) . |

* cited by examiner

Primary Examiner—David W. Wu
Assistant Examiner—Rixia Lu
(74) Attorney, Agent, or Firm—Jim D. Wheelington (57) ABSTRACT

A process for producing a chromium-based catalyst for the production of polyethylene, the process comprising providing a silica support having a surface area of at least 380 $m^2/g$ and a pore volume of at least 1.5 ml/g; impregnating the silica support with a liquid including a source of aluminum ions and a source of phosphate ions; neutralizing the resultant impregnated support with a neutralizing agent to provide a pH greater than 7 for the resultant neutralized support whereby aluminum phosphate forms in pores of the silica support; and, at any stage in the method, impregnating the silica support with a chromium component.

21 Claims, 6 Drawing Sheets

CATALYSTS FOR POLYETHYLENE PRODUCTION AND USE THEREOF

BACKGROUND TO THE INVENTION

The present invention relates to a process for the production of chromium-based catalysts for the production of polyethylene and to the use of such catalysts.

DESCRIPTION OF THE PRIOR ART

Polyethylene is well known for use in the manufacture of various articles. It is generally desirable for the polyethylene resin to have good processing properties whereby the polyethylene may readily be processed to form the appropriate article. In order to achieve such good processability of the polyethylene resins, it is desired that the flow properties of the polyethylene resins are improved by broadening the molecular weight distribution of the polyethylene. In addition, for some applications, it is desirable that the polyethylene resin has a higher melt index, which is an indication of lower molecular weight polyethylene polymers. A number of different catalyst systems have been disclosed for the manufacture of polyethylene, in particular high density polyethylene HDPE. It is known in the art that the physical properties, in particular the mechanical properties, of a polyethylene product vary depending on what catalytic system was employed to make the polyethylene. This is because different catalyst systems tend to yield different molecular weight distributions in the polyethylene produced. It is known to employ a chromium-based catalyst. Such a chromium-based catalyst enables the production of polyethylene having desirable physical and rheological properties. There is a continuous incentive to develop new chromium-based catalysts for the production of polyethylene resins having improved mechanical or processing properties.

There is a particular need for the development of new blow moulding HDPE with improved environmental stress crack resistance (ESCR)/rigidity compromise. This in turn allows downgauging in the manufacture of bottles, e.g. for corrosive liquids.

Such supported chromium-oxide catalysts which have been developed for the production of linear high density polyethylene resins incorporate a support which is usually a silica, or a modified silica, with a large surface area, typically greater than 200 $m^2/g$, and a large pore volume, typically greater than 0.8 ml/g. The support may be modified so as to include cogels such as silica-titania or silica-alumina and by the replacement of silica by alumina or amorphous aluminum phosphates. Furthermore, the support may comprise a tergel which is produced by mixing a chromium source with a silica and a titania compound.

Amorphous aluminum phosphates with both high surface area and pore volume have been found in the art to be difficult to produce. Consequently, it has been known into art to use a process known as "poregelisation" for introducing a metal phosphate, in particular aluminum phosphate, into the silica support. EP-A-0055864 discloses such a process for introducing metal phosphates into the silica support of a chromium-based catalyst for olefin polymerisation. In contrast to standard chromium-based catalysts having a support just of silica which has been impregnated with chromium oxide, the metal phosphate supported chromium-based catalysts are characterised by an outstanding sensitivity to hydrogen. The introduction of hydrogen into the polymerisation medium induces a drastic increase in the melt flow index of the resultant polyethylene resins. In addition, the introduction of triethyl boron (TEB) cocatalysts can result in an increase of the melt flow index of the polyethylene resins, whereas with standard chromium-based catalysts incorporating a silica support the TEB induces a decrease in the melt flow index. In addition, the metal phosphate supported chromium-based catalysts can produce resins with a broad molecular weight distribution and good mechanical properties particularly improved environmental stress cracking resistance (ESCR).

However, the metal phosphate supported chromium-based catalysts disclosed in EP-A-0055864 suffer from the disadvantage that the melt index potential of the catalyst is quite low without the use of hydrogen and/or TEB in a polymerisation medium. Moreover, those catalysts suffer from the technical problem that they have relatively low activity for the polymerisation process for the manufacture of polyethylene. Also, the use of high activation temperatures or of hydrogen often results in a decrease in the mechanical properties of the resins, mainly the ESCR.

The technique of "poregelisation" disclosed in EP-A-0055864 includes the coating of a silica carrier with an amorphous aluminum phosphate by the impregnation of an aluminum phosphate gel inside the pores of the support. Chromium can be added during this step or afterwards, for example by standard impregnation techniques. A particular method disclosed in EP-A-0055864 for impregnating a silica hydrogel or xerogel with aluminum orthophosphate involves combining a source of aluminum ions and phosphate ions with a slurry of a silica hydrogel or xerogel and then evaporating the solvent by conventional techniques whereby aluminum phosphate forms in the pores of the silica. The phosphate gel can be formed in the process by neutralisation with a neutralising agent, such as ammonium hydroxide. The resultant impregnated silica is then dried and activated at elevated temperature.

A commercial poregel catalyst developed according to the process disclosed in EP-A-0055864 is available in commerce from the company Grace Davison. The catalyst is characterised by both low surface area (234 $m^2/g$) and pore volume (1.15 ml/g). This results in poor catalyst activity and a low melt index potential. There is a need to improve this commercially available catalyst.

EP-A-0055864 discloses three other methods for producing a metal phosphate supported chromium-based catalyst system for olefin polymerisation.

One, method involves the production of a cogel of silica/alumina/phosphorous oxide by coprecipitation of silicate ions, aluminum ions and phosphate ions, with subsequent neutralisation to form the cogel. The neutralisation may be achieved by concentrated ammonium hydroxide.

The second method forms an aluminum phosphate matrix, with silica as a dispersed phase therein. In this method, a silica hydrogel or xerogel is combined with aluminum orthophosphate which is then precipitated.

The third method involves mixing of a silica xerogel with an aluminum orthophosphate xerogel to form a gel mixture.

WO-A-94/26790 discloses, like the cogel production method described above, a method for making a precursor gel for a catalyst support by cogelification of at least two components chosen among silica, alumina and aluminum phosphate.

EP-A-0799841 also discloses a cogelification process to form a support containing at least two constituents selected from silica, alumina and aluminum phosphate.

EP-A-0712868 and EP-A-0757063 similarly disclose cogelation processes.

SUMMARY OF INVENTION

It is an aim of the present invention to provide a process for producing a catalyst for use in the polymerisation of ethylene which at least particularly overcome the problems of the prior art as identified above. It is a further aim of the present invention to provide such a process wherein the resultant catalyst has improved melt index potential and activity in the polymerisation of ethylene, the activity being improved without requiring the catalyst to be employed either with a cocatalyst such as TEB or with hydrogen. It is a further aim of the present invention to provide such a catalyst which can yield resins with enhanced ESCR/rigidity compromise, and thus improved mechanical properties. It is yet a further aim of the present invention to provide such a catalyst which can yield resins having an increased shear response (SR) and thus improved processability.

Accordingly, the present invention provides a process for producing a chromium-based catalyst for the production of polyethylene, the process comprising providing a silica support having a surface area of at least 380 m$^2$/g and a pore volume of at least 1.5 ml/g; impregnating the silica support with a liquid including a source of aluminum ions and a source of phosphate ions; neutralising the resultant impregnated support with a neutralising agent to provide a pH greater than 7 for the resultant neutralised support whereby aluminum phosphate forms in pores of the silica support; and, at any stage in the method, impregnating the silica support with a chromium component.

The present invention further provides the use of the catalyst produced in accordance with the invention for increasing the melt index and/or shear response of polyethylene resins.

The present invention further provides the use of the catalyst produced in accordance with the invention for increasing the ESCR/rigidity compromise of polyethylene resins.

The present invention is predicated on the surprising discovery by the inventor that by the use of a silica support having a high surface area and pore volume in conjunction with a neutralisation step, which also hydrolyses the aluminum/phosphorous compounds impregnated into the support, and also any chromium compounds impregnated into the support, whereby the final pH of the neutralised solution is relatively high by providing excess basic neutralising agent, typically ammonium hydroxide, this can result in an improved melt index potential and activity of the final catalyst and/or an improved ESCR/rigidity compromise in resins produced by the final %catalyst. The present invention is further predicated on the surprising discovery by the inventors that the neutralisation with higher amounts of the basic neutralising agent, providing a higher final pH of the neutralised solution, favours increased chromium/aluminum phosphate incorporation into the silica support, thereby resulting in an improved melt index potential, even through the final surface area and the porosity of the silica carrier are not significantly affected.

The present invention is yet further predicated on the surprising discovery by the inventor that by the subsequent titanation of the catalyst can result in an improved shear response in resins produced by the final catalyst.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

The pore volume of the silica support is determined by nitrogen adsorption using the Barret Joyner Halenda method. Preferably the pore volume is from 1.6 to 2.0 ml/g. The surface area of the support is determined by the BET method and preferably is greater than 400 m$^2$/g.

Preferably, the chromium compound is impregnated into the silica support by a common aqueous impregnation solution which also includes the source of aluminum ions and the source of phosphate ions. A typical impregnation solution is prepared by dissolving aluminum nitrate nonahydrate $Al(NO_3)_3.9H_2O$, ammonium dihydrogen phosphate $(NH_4)H_2PO_4$ and chromium nitrate nonahydrate $(Cr(NO3)_3.9H_2O)$ in deionised water.

The amounts of the aluminum and phosphorous compounds in the impregnation solution are preferably calculated so as to provide in the impregnation solution a phosphorous/aluminum atomic ratio ranging from 0.4 to 0.95, preferably from 0.5 to 0.85, and a final aluminum phosphate content in the catalyst of from 10 to 30 wt %, preferably 15 to 25 wt %, based on the weight of the final chromium-based catalyst. Preferably, the catalyst has a chromium content of from 0.5 to 1.5 wt %, more preferably from 0.75 to 1.1 wt %, based on the weight of the chromium-based catalyst. When preparing the impregnation solution, in order that free impregnation solution is provided after the impregnation step, the amount of water employed to make up the impregnation solution is preferably at least 2 times the pore volume of the silica employed, more preferably from 2 to 5 times the pore volume of the silica employed, most typically around 3 times the pore volume of the silica support.

The neutralisation agent typically comprises concentrated ammonia hydroxide solution, for example such a solution comprising 25 wt % ammonia.

In the preferred process of the invention, the silica support is preferably dried prior to the impregnation step, preferably by heating the silica support to a temperature of at least 100° C. in an oven. Thereafter the dried silica support is added to the impregnation solution. The mixture is preferably maintained under smooth stirring for a few minutes in order to ensure complete impregnation of the aluminum phosphate into the pores of the silica support.

Then, under continued stirring, the neutralising agent, preferably comprising a concentrated solution of ammonium hydroxide, is progressively added, preferably drop by drop. This causes the aluminum phosphate gel to be formed in the pores. The amount of neutralising agent added determines the degree of neutralisation of the aluminum and phosphorous compounds employed to form the aluminum phosphate. In this specification, the percentage neutralisation is calculated using the following formula:

$$\% \text{ Neutralisation} = \frac{(\text{No. of mols NH}_4\text{OH added}) \times 100}{(\text{No. of mols Al(NO}_3)_3 \times 3) - (\text{No. of mols NH}_4\text{H}_2\text{PO}_4)}$$

The percentage neutralisation so calculated preferably varies from greater than 150% to up to 300%. The present inventors have discovered that a high degree of neutralisation tends to enhance the melt index potential of the final catalyst. Consequently, the preferred percentage neutralisation is greater than 150%. This substantially corresponds to a pH of the final mixture of greater than 8.

After addition of the neutralising agent, the mixture is allowed to age typically for a period of from 5 hours to greater than 5 days and at a typical temperature of room temperature (25° C.).

Thereafter, the silica support impregnated with the aluminum phosphate gel is washed with deionised water until the pH is stable. The support is subsequently washed with a low surface tension, water-miscible organic liquid, typically an alcohol such as isopropanol. The washing can be performed while filtering the impregnated support using a buckner funnel. The present inventors have found that insufficient washing with water or insufficient displacement of water by the organic liquid tends to result in reduced surface area and porosity of the final catalyst.

After the washing step, the gel impregnated silica support is dried, typically in a ventilated oven at around 80° C., and then comminuted, for example by crushing, and sieved to achieve the correct particle size distribution.

In a preferred aspect of the invention the catalyst is titanated, and initially the supported chromium/silica-aluminophosphate catalyst is dehydrated, preferably by heating in a stream of fluidised dry inert and non-oxidising gas, such as nitrogen at a temperature of at least 300° C., for 0.5 to 2 hours in order to remove all physically adsorbed water. The removal of physically adsorbed water avoids the formation of $TiO_2$ as a product from the reaction of water with the titanium compound subsequently introduced during the titanation procedure, as described below.

In a next step, the supported chromium/silica-aluminophosphate catalyst is loaded with a titanium compound. The titanium compound may be of the formula $R_n\text{Ti}(\text{OR'})_m$ and $(\text{Ro})_n\text{Ti}(\text{OR'})_m$ wherein R and R' are the same or different and can be any hdyrocarbyl group containing from 1 to 12 carbon atoms, n is 0 to 3, m is 1 to 4 and m+n equals 4. Preferably, the titanium compound is a titanium tetraalkoxide $\text{Ti}(\text{OR'})_4$ where R' can be an alkyl or a cycloalkyl group each having from 3 to 5 carbon atoms. The titanation is performed by progressively introducing the titanium compound into the stream of dry, inert non-oxidising gas described hereabove in the dehydration step. In the titanation step, the temperature is, as for the dehydration step, maintained at least at 300° C. Preferably, the titanium compound is pumped as a liquid into the reaction zone where it vaporises. The titanation step is controlled so that the titanium content of the resultant catalyst is from 1 to 5% by weight, and preferably from 2 to 4% by weight, based on the weight of the titanated chromium/silica-aluminophosphate catalyst. The total amount of titanium compound introduced into the gas stream is calculated in order to obtain the required titanium content in the resultant catalyst and the progressive flow rate of the titanium is adjusted in order to provide a titanation reaction period of 0.5 to 1 hour.

After the introduction of the titanium compound has been terminated at the end of the reaction period, the catalyst is flushed under the gas stream for a period of typically 0.75 hours.

The dehydration and titanation steps are performed in the vapour phase in a fluidised bed.

Prior to use in a polyethylene polymerisation process, the catalyst is activated in dry air at an elevated temperature, for example 500 to 900° C., more preferably 600 to 800° C., most preferably around 650° C., preferably for at least 6 hours. With a titanated catalyst, the atmosphere is progressively changed from nitrogen to air, and the temperature is progressively increased, from the titanation step to the activation step. The activation treatment can optionally include additional specific treatments such as, for example, post-reduction with carbon monoxide or fluorination. The resultant activated catalyst may be used in the manufacture of polyethylene resins, comprising homopolymers or copolymers, for example by the known slurry process. The activated catalyst can be employed in conjunction with cocatalysts such as trialkyl aluminum, trialkyl borane, or dialkyl zinc. The resultant polyethylene resins can be used for blow moulding, extrusion or film applications.

Since the aluminum phosphate-impregnated chromium-based catalyst produced in accordance with the invention has enhanced melt index potential, there is much less or no requirement to use the catalyst in conjunction with a cocatalyst, or to employ hydrogen in the polymerisation reactor, in order to obtain polyethylene resins having a high melt index.

The aluminum phosphate-impregnated chromium-based catalyst produced in accordance with the invention enables enhanced ESCR/rigidity compromise to be achieved.

Also, the shear response SR2 at a given melt index is increased, resulting in better processability and/or mechanical properties.

The present invention will now be described in greater detail with reference to the following non-limiting Examples.

EXAMPLE 1

In this Example an aluminum phosphate-impregnated chromium-based catalyst is prepared in accordance with an embodiment of the invention.

The silica support or carrier comprised a silica support having a surface area of around 414 m$^2$/g and a pore volume of around 1.8 ml/g. The silica carrier was subjected to a pretreatment step wherein 20 g of the silica carrier were dried at 100° C. for 12 hours in an oven and then cooled down in a desiccator.

Initially, the impregnation solution was prepared, in which 20.3 g of aluminum nitrate nonahydrate and 3.82 g of ammonium dihydrogen phosphate were melted together in a beaker at a temperature of around 90° C. Then, 1.94 g of chromium (III) nitrate nonahydrate were added to the melt mixture and the resultant melt was maintained at the temperature of around 90° C. Deionised water was added to the heated mixture to form the impregnation solution, the amount of deionised water being added so as to bring the solution up to a volume of 100 ml. The pretreated silica carrier was added to the impregnation solution and the solution was smoothly stirred for a period of around 10 minutes.

In order to form the gel and impregnate the ammonium phosphate in the pores of the silica carrier, the neutralising agent was added to the slurry of the silica carrier in the impregnating solution. Under stirring, 21.6 ml of ammonium hydroxide solution, comprising 25 wt % ammonia, were added, drop by drop, to the mixture. After completion of the ammonium hydroxide addition, the stirring was maintained for a further period of 10 to 15 minutes. Thereafter, the gel was permitted to age overnight at room temperature. The final pH of the neutralised gel was 9.

The amounts of aluminum nitrate, ammonium dihydrogen phosphate and silica carrier were selected so as to provide in the resulting catalyst a target composition for the carrier of 20 wt % $AlPO_4$ and 80 wt % silica and with a phosphorous/aluminum molar ratio of 0.6. The amount of chromium nitrate was selected so as to provide in the resultant catalyst an amount of chromium in the catalyst, based on the weight of the catalyst, of from 0.7 to 1.0 wt %, most particularly 0.9 wt % Cr.

After the ageing step, the hydrogel/silica mixture so obtained was washed four times with deionised water and then three times with isopropanol at room temperature. The washing was carried out by adding 100 ml of the appropriate washing solution, i.e. either the deionised water or the isopropanol, to the gel, then stirring the resultant solution for 10 minutes with a magnetic stirrer, filtering off the gel on a buckner funnel having a porosity of around 3, while maintaining a wet filtrate, and recovering the washed filtrate.

After the final washing step, the gel was dried at a temperature of around 80° C. in an oven. Thereafter, the dried catalyst was smoothly crushed in a mortar and sieved to remove the largest particles. In the final catalyst, the surface area (BET) was 378 $m^2/g$ and the pore volume was 1.57 ml/g. The catalyst composition, on a dry basis, included 0.87 wt % Cr, 9.5 wt % $Al_2O_3$ and 8.2 wt % $P_2O_5$, each being based on the weight of the final catalyst. The P/Al molar ratio was 0.6.

The catalyst was activated in air for a period of 6 hours at a temperature of 650° C. and was subsequently used for ethylene polymerisation. The target productivity of the catalyst was around bOOg PE/g catalyst. The polymerisation took place in an autoclave reactor having a volume of 4 liters. The ethylene concentration was kept at 6 wt % in the polymerisation reactor based on the weight of the diluent The diluent comprised isobutane in an amount of 2 liters. The polymerisation temperature was maintained at 100° C. In a first run, polyethylene homopolymer was produced. In a second run, a copolymer was obtained by injecting 0.5 wt % 1-hexene based on the amount of diluent into the polymerisation reactor. In a third run, the effect of hydrogen on the polymerisation conditions was tested by introducing 10Nl of hydrogen gas into the reactor.

The polymerisation results are shown in Table 1. This shows the high load melt index (HLMI) of each of a polyethylene homopolymer, a polyethylene copolymer and a polyethylene homopolymer with hydrogen addition produced in the polymerisation reactor as outlined above. The high load melt index was determined using the procedures of ASTM D1238 using a load of 21.6 kg at a temperature of 190° C.

EXAMPLE 2

A further catalyst was prepared according to the process described hereinabove with reference to Example 1, except that a lower amount of ammonium hydroxide was used as the neutralising agent in the hydrolysis/neutralisation step. The amount of ammonium hydroxide employed was sufficient to provide a percentage neutralisation, using the formula stated above, of 150%, giving a final pH of the aluminum phosphate gel-impregnated silica carrier of pH8. The final catalyst had a surface area (BET) of 366 $m^2/g$ and a pore volume of 1.56 ml/g.

The catalyst of Example 2 was also used to produce polyethylene resins in a manner similar to that described above with reference to Example 1 and the results are also shown in Table 1.

COMPARATIVE EXAMPLE 1

In Comparative Example 1 a catalyst was prepared using the process according to Example 2, except that an even lower amount of ammonium hydroxide was used as the neutralisation agent for the hydrolysis/neutralisation steps. In Comparative Example 1, the degree of neutralisation, as determined by the above-specified formula, was 100% with the final pH of the aluminum phosphate gel-impregnated silica carrier being pH 5.5. This catalyst had a surface area (BET) of 362 $m^2/g$ and a pore volume of 1.55 ml/g. The catalyst composition, on a dry basis, comprised 0.69 wt % Cr, 6.4 wt % $Al_2O_3$ and 7.3 wt % $P_2O_5$ each based on the weight of the final catalyst. The catalyst had a phosphorous/aluminum molar ratio of 0.8.

The catalyst of Comparative Example 1 was also used to produced polyethylene resins using a process similar to that described above with reference to Example 1 and the results are shown in Table 1.

COMPARATIVE EXAMPLE 2

A commercially available $Cr/AlPO_4-SiO_2$ catalyst available in commerce from Grace Davison under trade designation Poregel which was prepared under conditions similar to those disclosed with reference to Example III of EP-A-0055864 had a surface area (BET) of 234 $m^2/g$ and a pore volume of 1.15 ml/g.

The commercially available catalyst of Comparative Example 2 was employed in a polyethylene polymerisation process following activation in dry air at 650° C. in a manner similar to that described with reference to Example 1 and the results are shown in Table 1.

It may be seen from Table 1 that catalysts produced in accordance with the present invention as exemplified by Examples 1 and 2 can enable a higher melt index to be achieved in polyethylene homopolymers and copolymers, and polyethylene homopolymers with hydrogen addition, as compared to catalysts produced using lower neutralisation than that required by the process of the invention and as compared to the known commercially available catalyst. Such higher melt indexes in polyethylene resins obtained using catalysts in accordance with the invention constitute a significant technical advantage. The higher melt index which is achievable using the catalysts of the invention demonstrates that increased neutralisation of the gel-impregnated silica carrier, leading to a higher final pH, favours chromium and aluminum phosphate incorporation into the pores of the silica carrier without significantly modifying the surface area and the pore volume of the final catalyst. In addition, the higher neutralisation can result in a catalyst with enhanced melt index potential even though the surface area and the porosity of the catalyst are not significantly affected.

The catalysts fabricated in accordance with the embodiments of Examples 1 and 2 of the invention not only exhibit a higher melt index potential, but also a higher activity than the catalyst employing lower neutralisation and the known commercial poregel catalyst material.

EXAMPLE 3

In this Example an aluminum phosphate-impregnated chromium-based catalyst was prepared in accordance with Example 1.

The catalyst was activated in air for a period of 6 hours at a temperature of 650° C. and was subsequently used for ethylene polymerisation. The target productivity of the catalyst was around 1000 g PE/g catalyst. The polymerisation took place in an autoclave reactor having a volume of 4 liters. The ethylene concentration was kept at 6 wt % in the polymerisation reactor based on the weight of the diluent The diluent comprised isobutane in an amount of 2 liters. The polymerisation temperature was maintained at 100° C. A copolymer was obtained by injecting in one shot 0.5 wt % 1-hexene in isobutane based on the amount of diluent into the polymerisation reactor.

The polymerisation results are shown in Table 2. This shows the melt index ($MI_2$) and the high load melt index (HLMI) of the polyethylene copolymer. The melt index and the high load melt index were determined using the procedures of ASTM D1238 using respective loads of 2.16 kg and 21.6 kg at a temperature of 190° C. The shear response (SR2) and the density were also determined and the ESCR (100% Antarox) was also measured.

Figure 1:
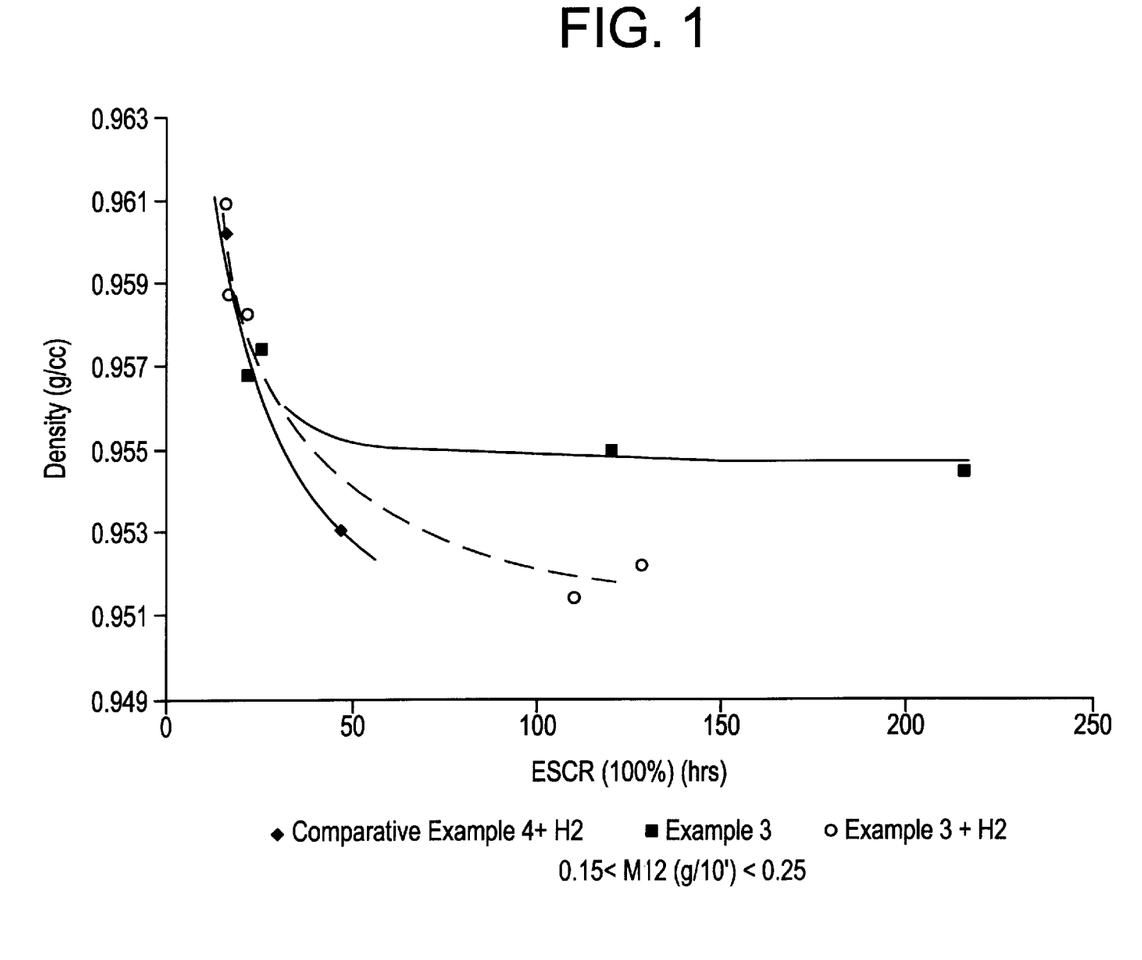
FIG. 1 shows the relationship between density and ESCR for resins produced in according with Examples of the invention and Comparative Examples.

A number of runs to produce resins of varying density were performed using the same catalyst and for each resin the ESCR 100% Antarox at 50° C. was measured. The density was varied by varying the amount of 1-hexene copolymer introduced into the reactor. The results are shown in FIG. 1.

Also, 10NlH$_2$ were added to the reactor in a number of further runs at varying density and the ESCR values were measured. These results are also shown in FIG. 1.

COMPARATIVE EXAMPLE 3

In Comparative Example 3 a catalyst was prepared using the process according to Comparative Example 1.

The catalyst of Comparative Example 3 was also used to produced polyethylene resins using a process similar to that described above with reference to Example 3 and the results are shown in Table 2.

It may be seen from Table 2 that the resin produced using a lower degree of neutralisation in accordance with Comparative Example 3 had a lower ESCR (1000% Antarox) even through the polyethylene resin obtained with that catalyst had a lower $MI_2$ and density than those of Example 3.

COMPARATIVE EXAMPLE 4

A commercially available Cr/AlPO$_4$-SiO$_2$ catalyst available in commerce from Grace Davison under trade designation Poregel which was prepared under conditions similar to those disclosed with reference to Example III of EP-A-0055864 had a surface area (BET) of 234 m$^2$/g and a pore volume of 1.15 ml/g.

The commercially available catalyst of Comparative Example 4 was employed in a polyethylene polymerisation process following activation in dry air at 650° C. in a manner similar to that described with reference to Example 3 except that the temperature was adjusted to get $MI_2$ as close as possible to 0.2 g/10 min, and the hexene content varied between 0 and 0.5wt %. In addition, 10NlH$_2$ were added to the reactor to enable a melt index $MI_2$ of 0.2 g/10 min to be achieved in the polyethylene resin.

As for Example 3, a number of runs at varying resin density were performed and for each run the ESCR 100% Antarox at 50° C. was measured. The results are also shown in FIG. 1.

From FIG. 1 it may be seen that the catalyst of the invention can provide high ESCR values particularly at lower densities. Without hydrogen added to the polymerisation medium, the ESCR values are very high, showing good mechanical resistance at a given density. With hydrogen added, the ESCR values are also higher than for the Comparative Example. In the Comparative Example in order to get a sufficient melt index $MI_2$, hydrogen must be introduced, but this is not required by the catalyst of the invention.

EXAMPLE 4

The catalyst produced in accordance with Example 3 was used in a number of runs in continuous pilot plant trials to produce HDPE. The catalyst was activated at 650° C. in dry air prior to use. The process conditions for the various runs are shown in Table 3, together with the properties of the resultant resins. Cocatalysts comprising either triethylborane (TEB) or triethylaluminum (TEAl) were employed in the amounts shown.

Figure 2:
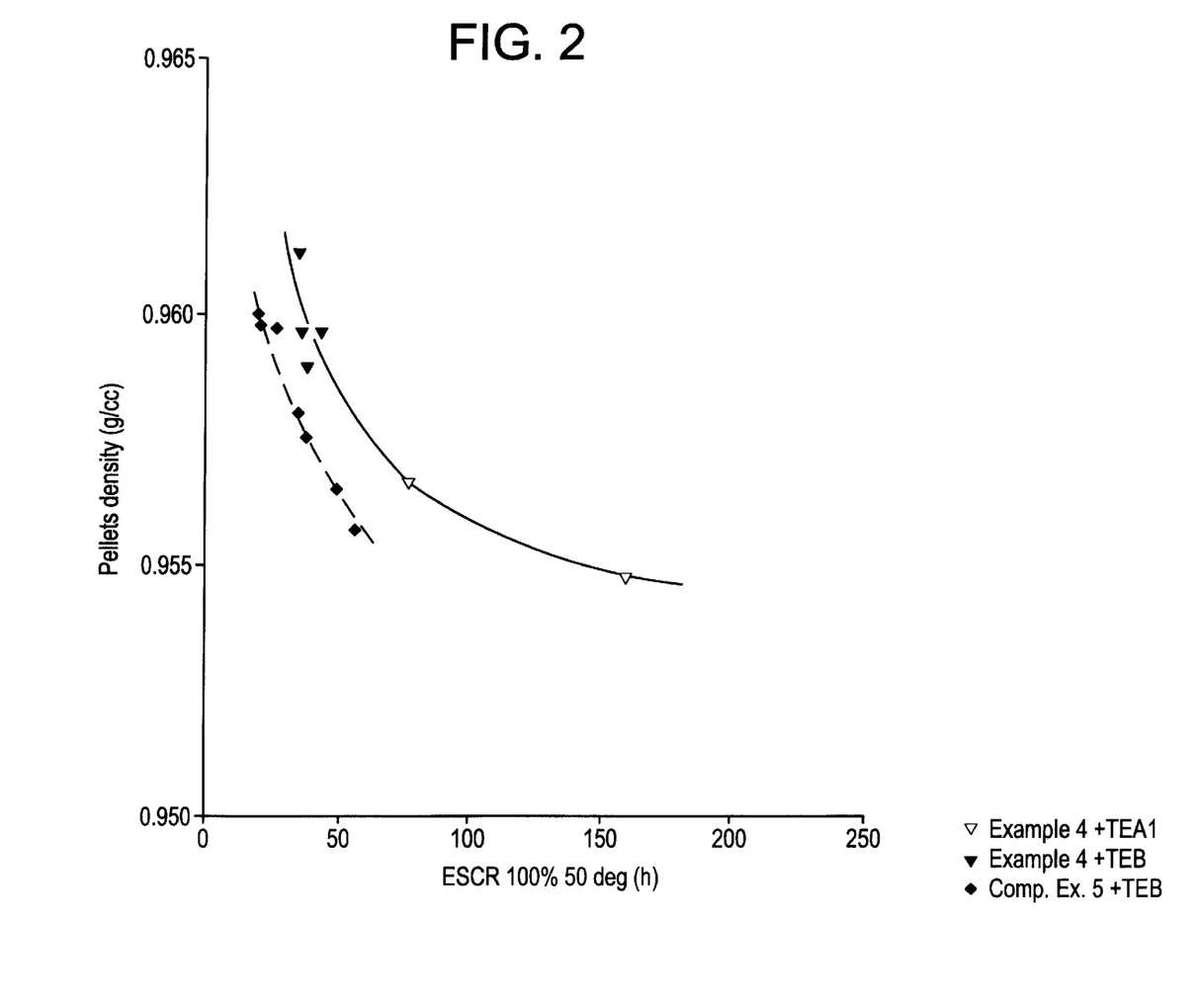
FIG. 2 shows the relationship between density and ESCR for resins produced in accordance with Examples of the invention and Comparative Examples.

The runs show that high ESCR values are obtained using the catalyst of the invention. FIG. 2 shows the relationship between the density and the ESCR for the resins of the various runs of Example 4.

The catalyst of the invention can product resins having a high melt index potential, as may be seen from Table 3.

Figure 3:
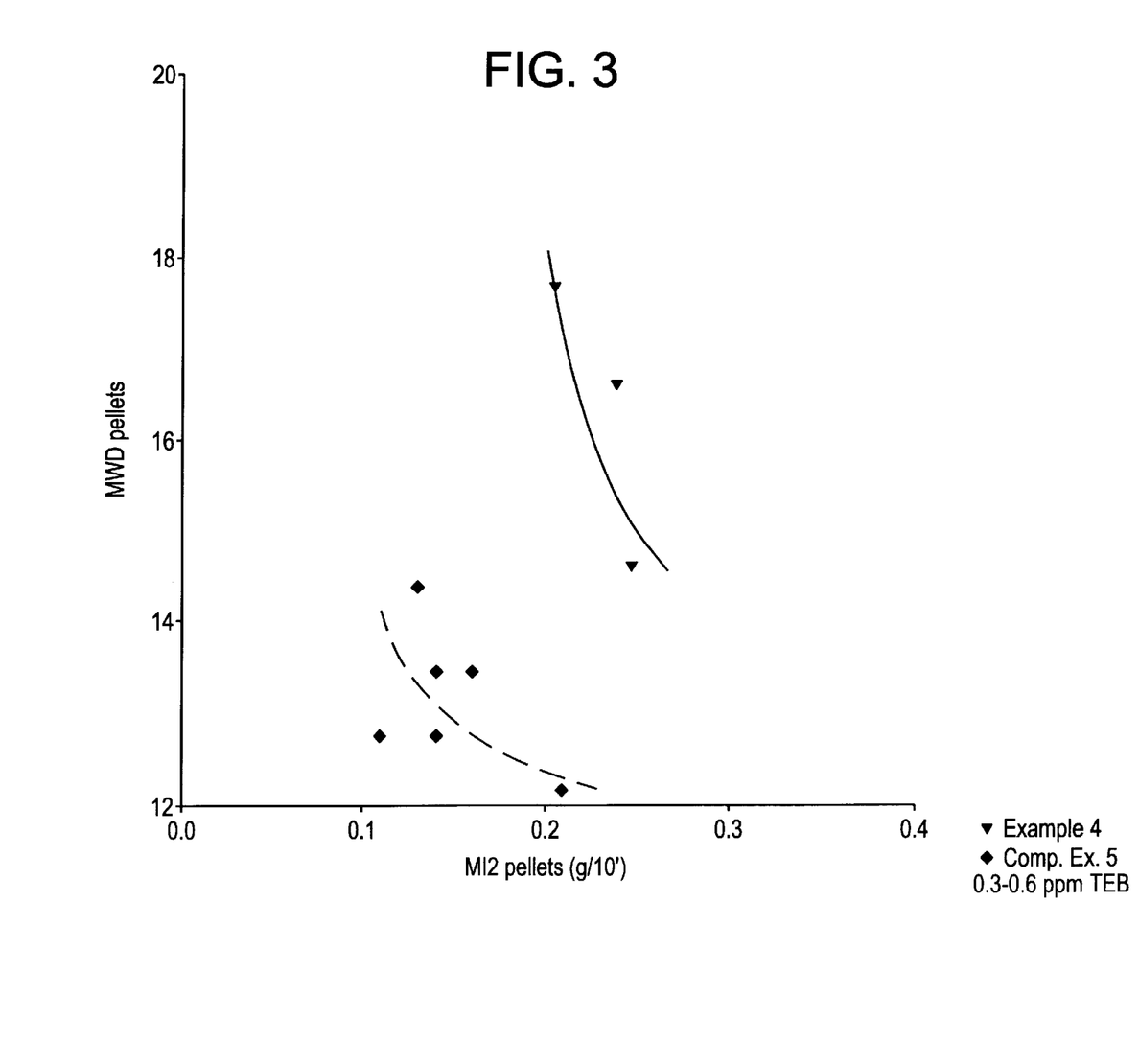
FIG. 3 shows the relationship between the molecular weight distribution and melt index for resins produced in accordance with Examples of the invention and Comparative Examples.

FIG. 3 shows the relationship between the molecular weight distribution (MWD) as determined by gel phase chromatography (GPC) of the resin pellets and the melt index $MI_2$ of the pellet produced in the runs having from 0.3 to 0.6 ppm TEB. This shows that a broad MWD is achieved.

COMPARATIVE EXAMPLE 5

Example 4 was repeated using, in a number of runs, the commercially available catalyst of Comparative Example 4, again after activation at 650° C. in dry air. Corresponding results are shown in Table 4 and FIGS. 2 and 3.

It may be seen that as compared to the commercial catalyst, the catalyst of the invention (i) has a better ESCR/rigidity compromise by providing higher ESCR values at a given density; (ii) has a higher MI potential by providing higher MI values; and (iii) has a broader MWD, i.e. higher MWD values at a given $MI_2$.

EXAMPLE 5

In this Example, the catalyst produced in accordance with the process of Example 1 was employed in the polymerisation process described with respect to the first run of Example 1 wherein polyethylene homopolymer was produced. A number of separate runs of that polymerisation process to produce polyethylene homopolymer were carried out at varying polymerisation temperatures, ranging from 98° C. to 104° C. The polyethylene homopolymers so produced were tested to determined their melt index $MI_2$ and high load melt index HLMI values and the results are shown in Table 5. It will be seen that both the $MI_2$ and HLMI values generally increase with increasing polymerisation temperatures.

Figure 4:
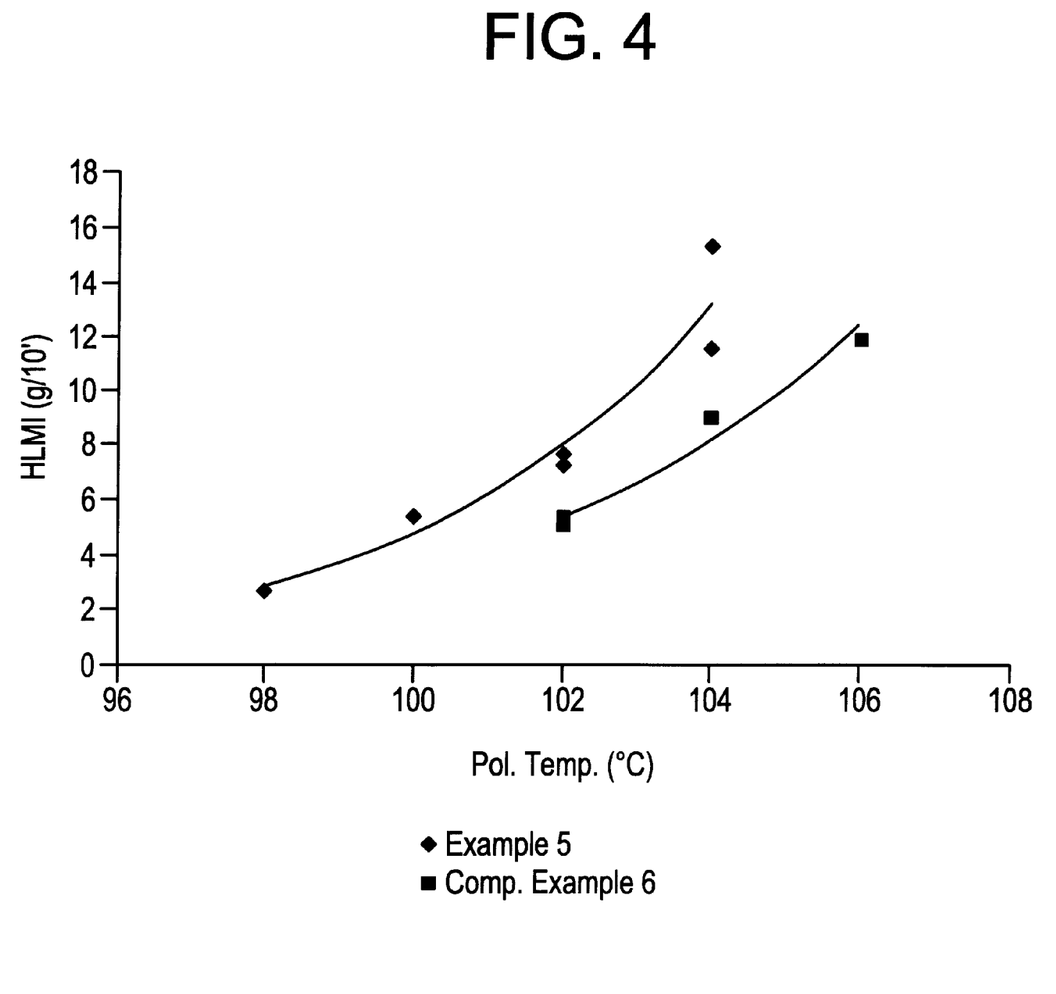
FIG. 4 shows the relationship between HLMI and polymerisation temperature for resins produced in accordance with Examples of the invention and Comparative Examples.

The relationship between the HLMI and the polymerisation temperature is also shown in FIG. 4.

COMPARATIVE EXAMPLE 6

In Comparative Example 6, a Cr/AlPO$_4$-SiO$_2$ catalyst was prepared under the conditions similar to those disclosed with reference to Example III of EP-A-0055864. The silica carrier comprised a silica available in commerce from the company Grace Davison under the trade designation 952 and the final pH of the gel following addition of ammonium hydroxide as disclosed in that Example III was 6.5.

Specifically, in the production of the catalyst, 45 g of the 952 grade silica having a surface area of around 300 m$^2$/g were dried in an oven a 110° C. overnight, cooled down in a desiccator, and then introduced into a double wall glass reactor having a volume of around 2 liters and being equipped with an agitator. An impregnation solution was prepared by dissolving 65.1 g of aluminum nitrate nonahydrate, 15.9 g of ammonium dihydrogenphosphate and 4.9 g of chromium nitrate nonahydrate in 100 ml of deionised water. The impregnation solution was then added to and mixed with the silica in the glass reactor. 50 ml of deionised water were further added to achieve good stirring of the mixture. The measured pH of the solution was pH 1. Stirring was maintained for a period of around 20 minutes at a temperature of around 30° C. Then, 34.6 ml of concentrated ammonium hydroxide (containing 25 wt % NH$_3$) were added drop by drop to the mixture under stirring, maintaining the temperature at around 30° C. The final pH after complete addition of the ammonium hydroxide and gel formation was around pH 6.5.

After 2 hours ageing, including 1 hour under stirring, the gel was washed with deionised water and twice with acetone, the gel being filtered after each washing by a Buckner funnel having a porosity value of 4. The resulting cake was then dried in a vacuum oven over night at a temperature of around 60° C. Finally, the catalyst was powdered and activated at a temperature of around 650° C in air.

Thereafter, the catalyst was employed in the polyethylene polymerisation process employed in Example 5 but at varying polymerisation temperatures. The results are shown in Table 5 and FIG. 4.

It will be seen that as for Example 5, for Comparative Example 6 the MI$_2$ and HLMI values generally increase with increasing polymerisation temperatures. However, it may be seen that in comparison with Example 5, the polyethylene homopolymers produced in accordance with the Comparative Example 6 have generally lower HLMI values for any given polymerisation temperature. This is clearly shown in FIG. 4. Thus the catalyst of the present invention can, in contrast to the prior art, enable improved polyethylene resins to be produced, which tend to have higher HLMI values when polymerised at a given temperature.

Accordingly, it may be seen that the melt index potential of the catalyst of Example 5 is higher than that of Comparative Example 6. This is believed to be due to the combination of a carrier having higher surface area and having a higher gelification pH during the catalyst preparation.

EXAMPLE 6

In this Example, a catalyst was prepared in accordance with Example 1, but was dehydrated and titanated prior to the activation step.

In the titanation process, the catalyst was first dried under a nitrogen flow at a temperature of 300° C. and then treated with a flow of titanium tetraisopropoxide and nitrogen at a temperature of 300° C. The injected amount of titanium tetraisopropoxide was calculated to obtain a desired amount of titanium in the final catalyst, preferably about 4 wt % Ti.

The catalyst was then used for ethylene polymerisation. The polymerisation took place in an autoclave reactor having a volume of 4 liters. The ethylene concentration was kept at 6 wt % in the polymerisation reactor based on the weight of the diluent The diluent comprised isobutane in an amount of 2 liters. The polymerisation temperature was from around 98 to 104° C. In a first run, polyethylene homopolymer was produced at a temperature of 104° C. In a second run, a copolymer was produced at 98° C. by injecting 0.5 wt % 1-hexene based on the amount of diluent into the polymerisation reactor.

The target productivity of the catalyst was around 1000 g PE/g catalyst.

The polymerisation results are shown in Table 6. This shows the melt index (MI$_2$) and the high load melt index (HLMI) of each of the polyethylene homopolymer and the polyethylene copolymer produced in the polymerisation reactor as outlined above. The melt index and the high load melt index were determined using the procedures of ASTM D1238 using respective loads of 2.16 kg and 21.6 kg at a temperature of 190° C. The shear response SR2 of the homopolymer and copolymer are also shown in Table 6. The catalyst activity was also determined and is shown in Table 6 for each run of Example 6.

In contrast, a catalyst was prepared using the process according to Example 6, but the catalyst was not titanated prior to activation.

The titanated catalyst was also used to produce polyethylene homopolymer and copolymer resins using a process similar to that described above with reference to Example 6 and the results are also shown in Table 6.

A comparison of the properties of the resins produced shows that the use of titanation of the particular Cr/silica-aluminophosphate catalysts produced in accordance with the invention drastically increases the melt index potential of the catalyst. For example, for the polyethylene homopolymer, the melt index MI$_2$ increases from 0.117 to 0.344 g/10 min when the polymerisation temperature is 104° C. Furthermore, the shear response SR2 at a given melt index MI$_2$ is also increased, resulting in better processing and/or mechanical properties. Finally, it may be seen from Table 6 that by employing titanation of the catalyst, the catalyst activity is increased by about 10 to 20%.

Accordingly, in accordance with a preferred aspect of the invention, the titanation of the particular Cr/silica-aluminophosphate catalysts can improve the catalytic activity and MI potential of this class of catalyst, thereby providing titanation as an alternative to the use of a cocatalyst such as TEB and hydrogen as in known Cr/silica-aluminophosphate catalysts. The use of titanation enables the mechanical properties of the polyethylene resins produced in the catalyst to be maintained, or even enhanced.

EXAMPLE 7

The catalyst produced in accordance with Example 6 was employed in a polyethylene polymerisation process without the use of hydrogen or a cocatalyst such as TEB under same polymerisation conditions disclosed in Example 6 to produce polyethylene resins of differing density. Thereafter, the ESCR of the resins was measured, the ESCR being the value of Bell ESCR F-50 at 100% Antarox at 50° C. and measured in accordance with ASTM D 1693-70, Procedure B. The variation between density and ESCR is illustrated in FIG. 5.

In contrast, Example 7 was repeated but the catalyst comprised the untitanated catalyst of Example 6. Again, polyethylene resins of varying density were produced, and the ESCR values of those resins were measured. The relationship between the density and the ESCR for those resins is illustrated in FIG. 5.

Figure 5:
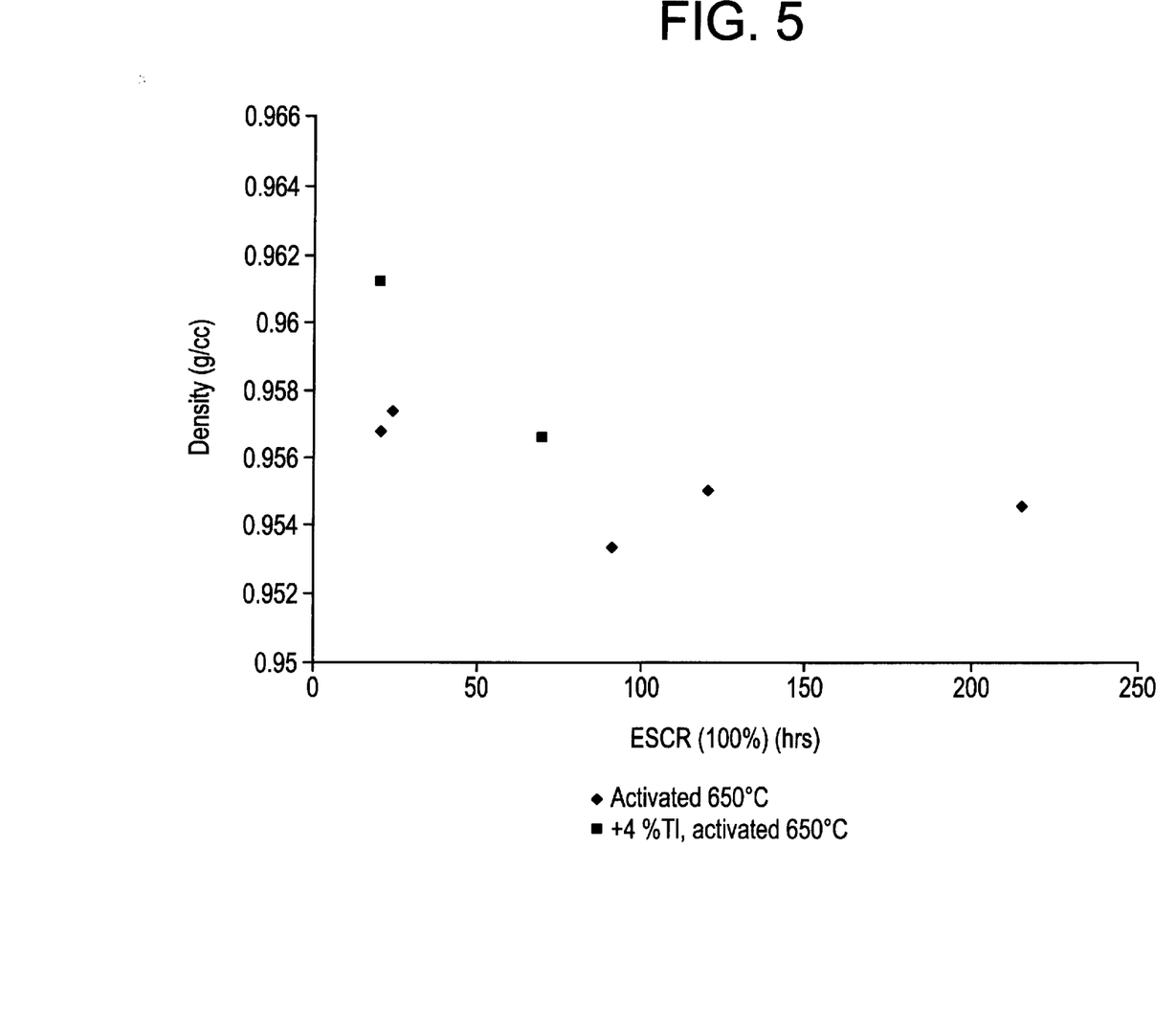
FIG. 5 shows the relationship between density and ESCR for resins produced in according with Examples of the invention.

FIG. 5 shows that by employing titanation of the particular Cr/silica aluminophosphate catalysts in accordance with the invention, a better density/ESCR compromise is achieved. In other words, for any given density, the ESCR obtained for polyethylene resins produced by employing titanated catalysts produced in accordance with a preferred aspect of the present invention was enhanced.

EXAMPLE 8

Figure 6:
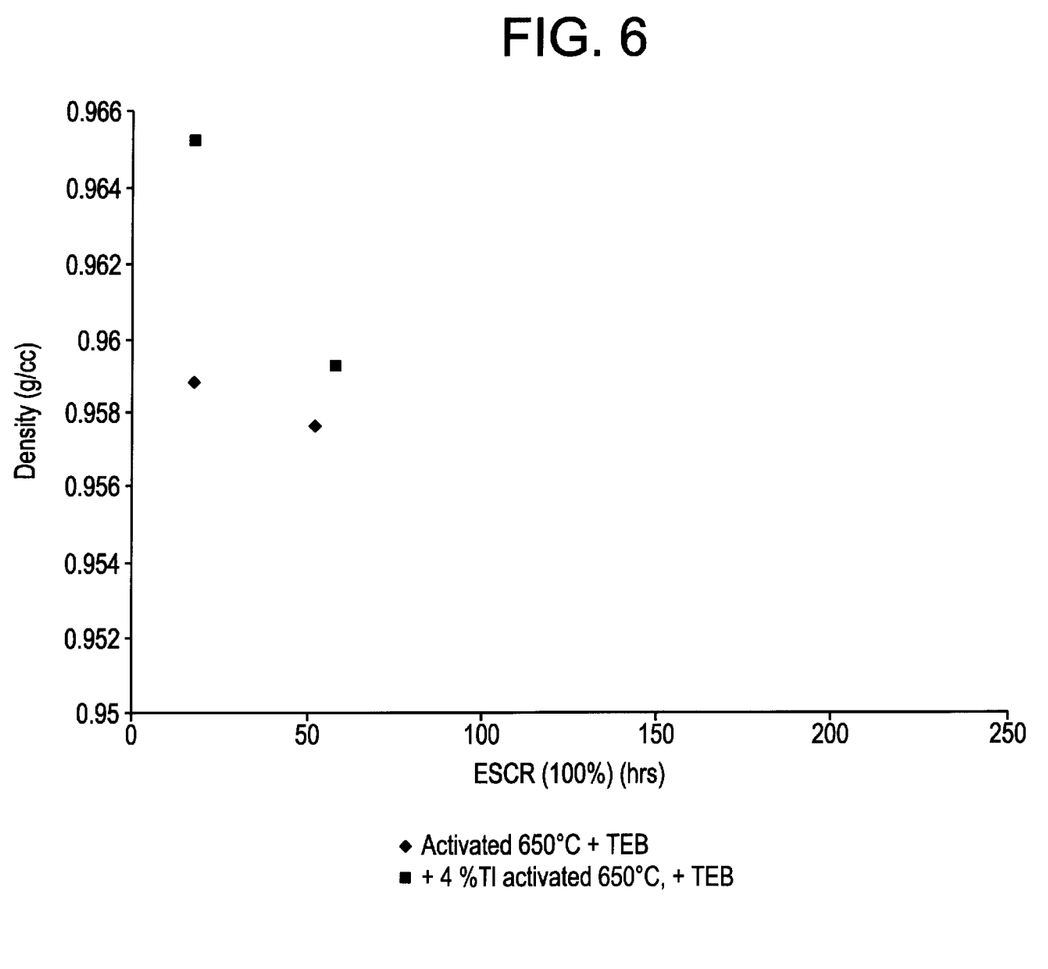
FIG. 6 shows the relationship between density and ESCR for resins produced in accordance with Examples of the invention.

Example 7 was repeated to produce polyethylene resins using the catalyst of Example 7 which had been titanated, but for Example 8 the polymerisation was carried out in the presence of a TEB cocatalyst. Again, polyethylene resins of differing density were produced and the ESCR for those resins was measured. The relationship between density and ESCR for those resins is illustrated in FIG. 6.

Example 8 was repeated but employing as the catalyst the untitanated catalyst of Example 6. Again, the density and ESCR for resins produced using the untitanated catalyst were determined, and the results are shown in FIG. 6.

As for FIG. 5, it may be seen that titanated catalysts produced in accordance with a preferred aspect of the present invention enable an enhanced ESCR/rigidity compromise to be achieved when the catalyst is employed in the presence of a co-catalyst such as TEB.

TABLE 1

|  | | Catalyst Properties | | | HLMI (g/10 min) | | |
| --- | --- | --- | --- | --- | --- | --- | --- |
|  | Neutralisation (%) | Final pH after gelification | Surface Area ($m^2$/g) | Pore Volume (ml/g) | Homopolymer (100° C.) | Copolymer (100° C.) | Homopolymer +H2 (100° C.) |
| Example 1 | 200 | 9 | 378 | 1.57 | 5.5 | 16.2 | 23.8 |
| Example 2 | 150 | 8 | 366 | 1.56 | 3.3 | 11.6 | 16.1 |
| Comparative Example 1 | 100 | 5.5 | 362 | 1.85 | 3.4 | 7.5 | 7.6 |
| Comparative Example 2 | — | — | 234 | 1.15 | 1.6 | 2.9 | 5.0 |

TABLE 2

|  | | Catalyst Properties | | Resin Properties | | | | |
| --- | --- | --- | --- | --- | --- | --- | --- | --- |
|  | Neutralisation (%) | Surface Area ($m^2$/g) | Pore Volume (ml/g) | $MI_2$ (g/10 min) | HLMI (g/10 min) | SR2 | Density (g/cc) | ESCR 100% (h) |
| Example 3 | 200 | 378 | 1.57 | 0.14 | 16.2 | 116 | 0.956 | 424 |
| Comparative Example 3 | 100 | 362 | 1.55 | 0.07 | 7.5 | 107 | 0.952 | 352 |

TABLE 3

EXAMPLE 4

| | | RUNS | | | | | |
| --- | --- | --- | --- | --- | --- | --- | --- |
| | | 1 | 2 | 3 | 4 | 5 | 6 |
| LOOP OPERATING COND. | | | | | | | |
| Temp. | (° C.) | 103 | 103 | 103 | 102 | 101 | 101 |
| Alkyl type | | TEA1 | TEA1 | TEB | TEB | TEB | TEB |
| Alkyl | (ppm) | 1 | 0.5 | 0.5 | 0.5 | 0.5 | 1 |
| C2- | (kg/h) | 9 | 9 | 9.2 | 9 | 9 | 9 |
| C6- | (cc/h) | 52 | 52 | 55 | 51 | 48 | 54 |
| H2 | (Nl/h) | 5 | 5 | 5 | 5 | 2 | 2 |
| iC4 | (kg/h) | 26 | 26 | 26 | 26 | 26 | 26 |
| OFF GAS | | | | | | | |
| C2- | (wt %) | 4.8 | 4.8 | 4.7 | 4.8 | 5.0 | 5.3 |
| C6- | (wt %) | 0.07 | 0.03 | 0.03 | 0.06 | 0.07 | 0.09 |
| H2 | (mole %) | 0.03 | 0.03 | 0.03 | 0.05 | 0.01 | 0.01 |
| FLUFF | | | | | | | |
| HLMI | (g/10') | 26.6 | 22.0 | 33.2 | 39.9 | 30.4 | 38.6 |
| MI2 | (g/10') | 0.27 | 0.23 | 0.29 | 0.28 | 0.22 | 0.24 |
| SR2 | | 99 | 97 | 116 | 141 | 136 | 159 |
| Density | (g/cc) | 0.951 | 0.954 | 0.955 | 0.956 | 0.957 | 0.959 |

TABLE 3-continued

EXAMPLE 4

| | | RUNS | | | | | |
|---|---|---|---|---|---|---|---|
| | | 1 | 2 | 3 | 4 | 5 | 6 |
| Mn | (kDa) | 13.8 | 14.2 | 13.0 | 12.1 | 10.9 | 10.5 |
| Mw | (kDa) | 176 | 191 | 177 | 193 | 159 | 159 |
| Mz | (kDa) | 1736 | 1945 | 1671 | 1997 | 1765 | 1853 |
| MWD | | 12.8 | 13.4 | 13.7 | 15.9 | 14.6 | 15.1 |
| PELLETS | | | | | | | |
| HLMI | (g/10') | 22.4 | 21.7 | 27.9 | 33.7 | 31.6 | 41.5 |
| MI2 | (g/10') | 0.22 | 0.16 | 0.25 | 0.24 | 0.21 | 0.29 |
| SR2 | | 103 | 122 | 113 | 141 | 153 | 141 |
| Density | (g/cc) | 0.955 | 0.957 | 0.959 | 0.960 | 0.960 | 0.961 |
| Mn | (kDa) | 14.1 | 14.3 | 12.9 | 12.0 | 11.7 | 11.0 |
| Mw | (kDa) | 189 | 207 | 189 | 200 | 207 | 195 |
| Mz | (kDa) | 1811 | 1907 | 1758 | 2028 | 2082 | 2131 |
| MWD | | 13.4 | 14.4 | 14.6 | 16.6 | 17.7 | 17.7 |
| ESCR | | | | | | | |
| Bell 50° C. 100% | (h) | 160 | 78 | 40 | 45 | 38 | 37 |

TABLE 4

COMPARATIVE EXAMPLE 5

| | | RUNS | | | | | | | | |
|---|---|---|---|---|---|---|---|---|---|---|
| | | 1 | 2 | 3 | 4 | 5 | 6 | 7 | 8 | 9 |
| LOOP OPERATING COND. | | | | | | | | | | |
| Temp. | (° C.) | 106 | 106 | 106 | 106 | 106 | 106 | 106 | 106 | 106 |
| Alkyl type | | TEB | TEB | TEB | TEB | TEB | TEB | TEB | TEB | TEB |
| Alkyl | (ppm) | 0.4 | 0.5 | 0.5 | 0.5 | 0.5 | 0.5 | 0.5 | 1 | 1 |
| C2- | (kg/h) | 9 | 9 | 9.5 | 9.5 | 9.3 | 9 | 10 | 10 | 9 |
| C6- | (cc/h) | 0 | 0 | 98 | 130 | 103 | 0 | 59 | 0 | 57 |
| H2 | (Nl/h) | 52 | 54 | 58 | 60 | 59 | 60 | 60 | 60 | 60 |
| iC4 | (kg/h) | 26 | 26 | 26 | 26 | 26 | 26 | 26 | 26 | 26 |
| OFF GAS | | | | | | | | | | |
| C2- | (wt %) | 4.3 | 4.0 | 4.6 | 3.9 | 4.4 | 3.8 | 4.1 | 3.9 | 4.3 |
| C6- | (wt %) | 0.03 | 0.09 | 0.15 | 0.17 | 0.15 | 0.04 | 0.11 | 0.07 | 0.13 |
| H2 | (mole %) | 0.51 | 0.52 | 0.56 | 0.58 | 0.58 | 0.56 | 0.57 | 0.55 | 0.55 |
| FLUFF | | | | | | | | | | |
| HLMI | (g/10') | 19.6 | 24.0 | 26.1 | 32.0 | 28.8 | 25.6 | 28.1 | 31.6 | 34.9 |
| MI2 | (g/10') | 0.15 | 0.18 | 0.22 | 0.31 | 0.24 | 0.20 | 0.22 | 0.22 | 0.31 |
| SR2 | | 131 | 134 | 120 | 103 | 121 | 128 | 126 | 147 | 112 |
| Density | (g/cc) | 0.958 | 0.957 | 0.955 | 0.952 | 0.955 | 0.9565 | 0.954 | 0.957 | 0.954 |
| Mn | (kDa) | 15.8 | 14.3 | 15.0 | 14.3 | 14.0 | 15.0 | 13.4 | 11.6 | 12.3 |
| Mw | (kDa) | 211 | 199 | 184 | 183 | 181 | 197 | 168 | 162 | 158 |
| Mz | (kDa) | 1986 | 1925 | 1677 | 1937 | 1771 | 1716 | 1344 | 1387 | 1431 |
| MWD | | 13.4 | 13.8 | 12.3 | 12.8 | 13.0 | 13.1 | 12.4 | 14.0 | 12.8 |
| PELLETS | | | | | | | | | | |
| MLMI | (g/10') | 16.05 | 19.3 | 20.1 | 24.5 | 22 | 20.1 | 19.6 | 21.2 | 28.0 |
| MI2 | (g/10') | 0.11 | 0.13 | 0.14 | 0.21 | 1.16 | 0.135 | 0.14 | 0.14 | 0.22 |
| SR2 | | 146 | 48 | 144 | 117 | 138 | 149 | 140 | 151 | 127 |
| Density | (g/cc) | 0.960 | 0.958 | 0.957 | 0.956 | 0.957 | 0.960 | 0.958 | 0.960 | 0.958 |
| ESCR | | | | | | | | | | |
| Bell 50° C. 100% | (h) | 22 | 36 | 50 | 58 | | 23 | 39 | 29 | 40 |

TABLE 5

| EXAMPLE 5 | | | COMPARATIVE EXAMPLE 6 | | | EXAMPLE 5 | | | COMPARATIVE EXAMPLE 6 | | |
|---|---|---|---|---|---|---|---|---|---|---|---|
| Pol. Temp. (° C.) | MI$_2$ (g/10') | HLMI (g/10') | Pol. Temp. (° C.) | MI$_2$ (g/10') | HLMI (g/10') | Pol. Temp. (° C.) | MI$_2$ (g/10') | HLMI (g/10') | Pol. Temp. (° C.) | MI$_2$ (g/10') | HLMI (g/10') |
| 98 | 0.01 | 2.8 | 102 | 0.026 | 5.065 | 102 | 0.05 | 7.3 | 104 | 0.067 | 8.966 |
| 100 | 0.03 | 5.5 | 102 | 0.027 | 5.347 | 102 | 0.063 | 7.685 | 106 | 0.099 | 11.8 |

TABLE 5-continued

| | EXAMPLE 5 | | | COMPARATIVE EXAMPLE 6 | |
|---|---|---|---|---|---|
| Pol. Temp. (° C.) | MI$_2$ (g/10') | HLMI (g/10') | Pol. Temp. (° C.) | MI$_2$ (g/10') | HLMI (g/10') |
| 104 | 0.117 | 11.612 | | | |
| 104 | 0.171 | 15.403 | | | |

TABLE 6

| | WITH TITANATION | | WITHOUT TITANATION | |
|---|---|---|---|---|
| Treatment Polymer Type Pol. Temp. (° C.) | Run 1 Homo- polymer 104 | Run 2 Copolymer 98 | Run 1 Homo- polymer 104 | Run 2 Copolymer 102 |
| MI$_2$ (g/10 min) | 0.344 | 0.291 | 0.117 | 0.202 |
| HLMI (g/10 min) | 31.2 | 33.5 | 11.6 | 20.7 |
| SR2 | 91 | 115 | 99 | 103 |
| Activity (g/g/h) | 796 | 628 | 707 | 540 |

What is claimed is:

1. A process for producing a chromium-based catalyst for the production of polyethylene, the process comprising providing a silica support having a surface area of at least 380 m$^2$/g and a pore volume of at least 1.5 ml/g; impregnating the silica support with a liquid including a source of aluminum ions and a source of phosphate ions; neutralising the resultant impregnated support with a neutralising agent to provide a pH greater than 7 for the resultant neutralised support whereby aluminum phosphate forms in pores of the silica support; and, at any stage in the method, impregnating the silica support with a chromium component.

2. A process according to claim 1 wherein the resultant neutralised support has a pH of at least 8.

3. A process according to claim 1 wherein the pore volume of the silica support is from 1.6 to 2.0 ml/g.

4. A process according to claim 1 wherein the surface area of the support is greater than 400 m$^2$/g.

5. A process according to claim 1 wherein the chromium compound is impregnated into the silica support by a common impregnation solution which also includes the source of aluminum ions and the source of phosphate ions.

6. A process according to claim 5 wherein the impregnation solution comprises aluminum nitrate nonahydrate Al(NO$_3$)$_3$.9H$_2$O, ammonium dihydrogen phosphate (NH$_4$)H$_2$PO$_4$ and chromium nitrate nonahydrate (Cr(NO$_3$)$_3$.9H$_2$O dissolved in deionised water.

7. A process according to claim 1 wherein the aluminum ions and the phosphate ions have a phosphorous/aluminum atomic ratio ranging from 0.4 to 0.95.

8. A process according to claim 7 wherein the aluminum ions and the phosphate ions have a phosphorous/aluminum atomic ratio ranging from 0.5 to 0.85.

9. A process according to claim 1 wherein the aluminum phosphate content of the catalyst comprises from 10 to 30 wt % based on the weight of the chromium-based catalyst.

10. A process according to claim 9 wherein the aluminum phosphate content of the catalyst comprises from 15 to 25 wt % based on the weight of the chromium-based catalyst.

11. A process according to claim 1 wherein the catalyst has a chromium content of from 0.5 to 1.5 wt % based on the weight of the chromium-based catalyst.

12. A process according to claim 11 wherein the catalyst has a chromium content of from 0.75 to 1.1 wt % based on the weight of the chromium-based catalyst.

13. A process according to claim 1 wherein the neutralisation agent comprises concentrated ammonium hydroxide solution.

14. A process according to claim 1 further comprising the step, after the addition of the neutralising agent, of ageing the mixture for a period of at least 5 hours at room temperature of 25° C.

15. A process according to claim 1 further comprising the step, after the chromium impregnation and neutralization steps, of titanating the chromium-based catalyst.

16. A process according to claim 15 wherein the titanating step comprises titanating the chromium/silica-aluminophosphate catalyst at a temperature of at least 300° C. in an atmosphere of dry, inert gas containing a titanium compound of the general formula selected from R$_n$Ti(OR')$_m$ and (RO)$_n$Ti(OR')$_m$ wherein R and R' are the same or different and are a hydrocarbyl group containing from 1 to 12 carbon atoms, n is 0 to 3, m is 1 to 4 and m+n equals 4, to form a titanated chromium/silica-aluminophosphate catalyst having a titanium content of from 1 to 5% by weight of the titanated catalyst.

17. A process according to claim 16 further comprising, before the titanation step, the step of dehydrating the chromium/silica-aluminophosphate catalyst to remove physically adsorbed water by heating the catalyst at a temperature of at least 300° C. in an atmosphere of dry, inert gas.

18. A process according to claim 16 wherein the titanium compound is a tetraalkoxide of titanium having the general formula Ti(OR')$_4$ wherein R' is selected from and alkyl and a cycloalkyl each having from 3 to 5 carbon atoms.

19. A process according to claim 16 wherein the titanium content of the titanated catalyst is from 2 to 4% by weight of the titanated catalyst.

20. A process according to claim 1 further comprising the step of activating the catalyst at a temperature of from 500 to 900° C.

21. A process for producing a chromium-based catalyst for the production of polyethylene, the process comprising:
 a) providing a silica support having a surface area of at least 380 m$^2$/g and a pore volume of at least 1.5 ml/g;
 b) impregnating the silica support with a liquid including a source of aluminum ions and a source of phosphate ions;
 c) neutralizing the resultant impregnated support with a neutralizing agent to provide a pH greater than 7 for the resultant neutralized support whereby aluminum phosphate forms in pores of the silica support;
 d) impregnating, at any step above, the silica support with a chromium component to form a chromium-based catalyst;
 e) dehydrating the chromium-based catalyst by heating to a temperature of at least 300° C. in an atmosphere of dry, inert gas for 0.5 to 2 hours;
 f) titanating the chromium-based catalyst at a temperature of at least 300° C. in an atmosphere of dry, inert gas with a titanium compound of general formula selected from R$_n$Ti(OR')$_m$ or (RO)Ti(OR')$_m$ wherein R and R' are the same or different and are a hydrocarbyl group containing from 1 to 12 carbon atoms, n is 0 to 3, m is 1 to 4 and m+n equals 4, to form a titanated chromium/silica-aluminophosphate catalyst having a titanium content of from 1 to 5% by weight of the titanated catalyst; and
 g) flushing the catalyst with a dry, inert gas for about 0.75 hour.

* * * * *